Aug. 25, 1953  J. H. BOOTH ET AL  2,650,119
LINK ROD JOINT
Filed Aug. 4, 1949
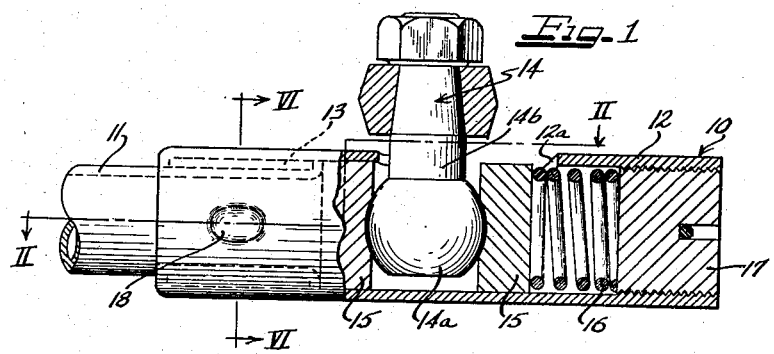
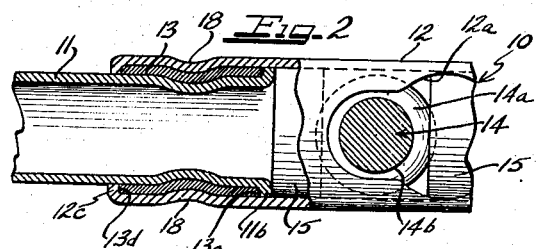
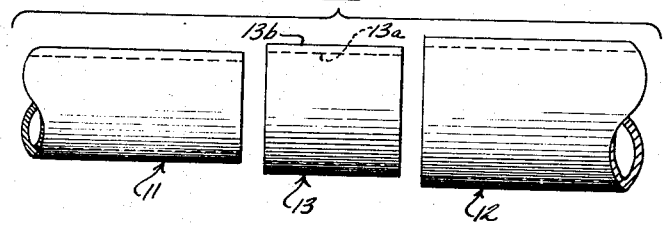
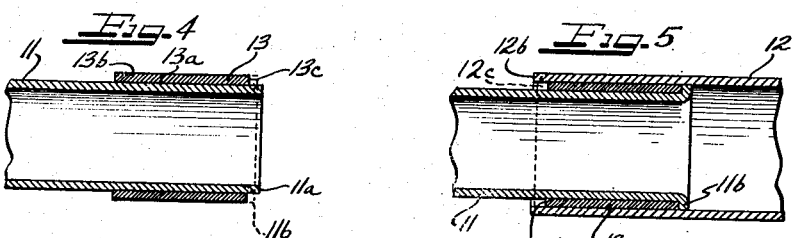
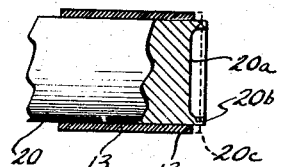
Inventors
JAMES H. BOOTH
BERNARD E. RICKS
by The Firm of Charles W. Hills
Attys.

Patented Aug. 25, 1953

2,650,119

UNITED STATES PATENT OFFICE 2,650,119

LINK ROD JOINT

James H. Booth, Venice Township, Shiawassee County, and Bernard E. Ricks, Ferndale, Mich., assignors to Thompson Products, Inc., Cleveland, Ohio, a corporation of Ohio Application August 4, 1949, Serial No. 108,552

1 Claim. (Cl. 287—109)

This invention relates to a method of attaching tubes or rods and to the assembled construction produced by the method. Specifically, the invention relates to a drag link end for automotive steering linkage wherein the drag link joint housing is composed of a short length of tubing that is attached to the drag link by an intermediate spacer tube.

The invention will be hereinafter specifically described as embodied in a drag link, but it should be understood that the principles of the invention are generally applicable to tubes and rod linkages so that the scope of this invention is not limited to any particular usage for the construction.

According to this invention, a drag link end is produced on a rod, which is either hollow or solid, by means of a spacer tube and a housing tube. The housing tube is of large enough diameter to receive the spacer tube, and the spacer tube in turn is of large enough diameter to fit on the rod. The outer end of the drag link rod is spun over the end of the spacer tube, thereby preventing the tube from sliding off the rod end. The inner end of the housing tube is spun over the inner end of the spacer tube, thereby preventing axial outward displacement of the housing tube. Localized portions of the telescoped tubes are deformed by staking, thereby locking the parts together against longitudinal or circumferential displacement.

It is, therefore, an object of the invention to provide a link rod assembly having a hollow housing on the end of a rod and utilizing an intermediate spacer tube to lock the housing to the rod.

A further object of the invention is to provide a drag link end formed of a housing tube, a spacer tube and an end portion of the drag link.

A further object of the invention is to unite tubes in fixed longitudinal and circumferential relationship by telescoping inner and outer tubes with a spacer tube therebetween and by spinning the outer tube inwardly over the spacer tube, by spinning the inner tube outwardly over the spacer tube end, and by locally deforming portions of all three nested tubes.

Another object of this invention is to lock three tubular members together by spinning and punching operations, thereby obviating the heretofore necessary practice of threading the parts or forming them integrally.

Other and further objects of the invention will be apparent to those skilled in the art from the following detailed description of the annexed sheet of drawings which, by way of a preferred example only, illustrates one embodiment of the invention.

On the drawings:

Figure 1 is a side elevational view, partly in vertical section, of a drag link end according to this invention;

Figure 2 is a fragmentary plan view of the drag link end of Figure 1, partly in horizontal cross-section, taken substantially along the line II—II of Figure 1;

Figure 3 is a fragmentary exploded side elevational view showing the tubular members and the manner in which they are arranged for assembly;

Figure 4 is a fragmentary vertical cross-sectional view illustrating the manner in which the spacer tube is locked on the inner tube;

Figure 5 is a view similar to Figure 4 but illustrating the manner in which the housing or outer tube is mounted on the spacer tube;

Figure 6 is a fragmentary transverse cross-sectional view taken along the line VI—VI of Figure 1 and illustrating staking tools for deforming the tubes; and Figure 7 is a fragmentary cross-sectional view with a part in elevation, illustrating a modified arrangement according to this invention wherein a solid rod has a hollow or recessed end portion thereof deformed to lock the spacer tube thereon.

As shown on the drawings:

The drag link end assembly 10 of Figures 1 and 2 is composed of a drag link or intermediate rod portion 11, a tubular housing 12, and a spacer tube 13. The tubular housing 12 carries a drag link joint assembly including a ball stud 14 having a ball head 14a in the housing carried on bearing disks 15 therein and having a shank 14b projecting freely through a key-hole slot 12a of the tube 12. A spring 16 acts on one of the bearing disks 15, and a closure plug 17 threaded into the open end of the housing 12 bottoms the spring. The stud 14 can tilt and rotate in the housing 12 and the spring is effective to urge the stud head into the narrow portion of the key-hole slot so that the stud cannot be removed from the housing 12 until the plug 17 is loosened to permit the head to be shifted to the large diameter portion of the key-hole slot.

As shown in Figure 3, the spacer tube 13 has a sufficiently large interior diameter 13a to snugly fit on the tube 11. The external diameter 13b of the spacer tube, on the other hand, is small enough to snugly fit within the housing tube 12. The tube 13 is much shorter than the tube 12 but has a sufficient length to afford sufficient bearing surface to firmly support the telescoped portions of the inner and outer tubes.

As shown in Figure 4, the spacer tube 13 is mounted on the end of a tube 11 with its outer end 13c spaced slightly axially inwardly from the outer end 11a of the tube 11. This projecting outer end portion 11a of the tube 11 is then spun radially outwardly as indicated in dotted lines to provide a flange 11b which overlies the end 13c of the tube and prevents axial displacement of the tube off the outer end of the tube 11. The flange 11b, however, does not extend beyond the outer diameter 13a of the tube 13.

The assembly produced as shown in Figure 4 next, as indicated in Figure 5, receives the housing tube 12 thereon. The housing tube 12 is telescoped over the tube 13 until its inner end 12b projects beyond the inner end 13d of the tube 13. This projecting inner end portion 12b is then spun inwardly to form an inturned flange 12c as shown in dotted lines overlying the end 13d of the intermediate tube 13. The flanges 11b and 12c are quite strong and cooperate to hold the housing tube 12 against axial displacement off the end of the rod 11.

In order to prevent inward axial displacement of the telescoped tubes 11 and 12, and in order to hold the tubes against circumferential displacement, localized dimple portions 18 are formed in the assembly. As shown in Figure 6, punches 19 with rounded end portions 19a will form the dimples 18 and locally depress all three of the nested tubes 11, 13 and 12. These deformed portions of the tubes prevent relative rotation of the parts and also prevent inward displacement of the housing tube over the rod or intermediate tube 11.

In the modification shown in Figure 7, the tube 11 is replaced with a solid rod 20 having a recessed end 20a providing an annular rim 20b which is spun outwardly to form a flange 20c, shown in dotted lines, engaging the outer end 13c of the spacer tube 13. The housing tube 12 is then spun over the inner end of the spacer tube 13 in the same manner described in connection with the hollow tube 11. This modification thus illustrates the manner in which a solid rod can be used to form the drag link end 10 of this invention.

From the above descriptions it will be understood that this invention provides a telescoped or nested tube assembly especially useful for drag link ends wherein a spacer tube connects an outer tube and an inner rod, which can be hollow or solid, and wherein the outer end of the inner tube or rod is spun over the outer end of the spacer tube while the inner end of the outer tube is spun over the inner end of the spacer tube. To further connect the nested tubes, portions thereof are locally deformed by a staking operation. The invention eliminates the heretofore necessary practice of forging enlarged hollow ends on rods or tubes as well as the threading together of rods or tubes. The spacer tube is effective to make possible the use of any desired housing tube and rod diameter since thick or thin spacer tubes can be used as desired.

It will be understood that modifications and variations may be effected without departing from the scope of the novel concepts of this invention.

We claim as our invention:

A rigid drag link end assembly comprising a drag link, a drag link housing of larger diameter than the drag link, a spacer tube having an outer diameter snugly fitting the inner diameter of the drag link housing and an inner diameter snugly fitting the outer diameter of the drag link, said spacer tube being disposed between telescoped portions of the housing tube and drag link, an outturned flange portion on the drag link overlying substantially the entire outer end of the spacer tube, an inturned flange portion on the housing overlying substantially the entire other end portion of the spacer tube, said spacer tube firmly supporting and interconnecting in fixed longitudinal position said telescoped portions, and locally deformed dimple portions in all of the telescoped members holding the members against relative rotation.

JAMES H. BOOTH.
BERNARD E. RICKS.

References Cited in the file of this patent

UNITED STATES PATENTS

| Number | Name | Date |
| --- | --- | --- |
| 604,863 | Hoyer | May 31, 1898 |
| 753,843 | Elliot | Nov. 10, 1903 |
| 1,686,254 | Rachlin | Oct. 2, 1928 |
| 1,786,717 | Moore et al. | Dec. 30, 1930 |
| 1,797,691 | Merrill | Mar. 24, 1931 |
| 1,829,306 | Sneed | Oct. 27, 1931 |
| 2,423,745 | Wolfram | July 8, 1947 |

OTHER REFERENCES

Automotive Industries, September 13, 1930.